No. 682,658. Patented Sept. 17, 1901.
J. M. WISHART.
SOLAR HEATER.
(Application filed June 4, 1900.)
(No Model.) 2 Sheets—Sheet 1.
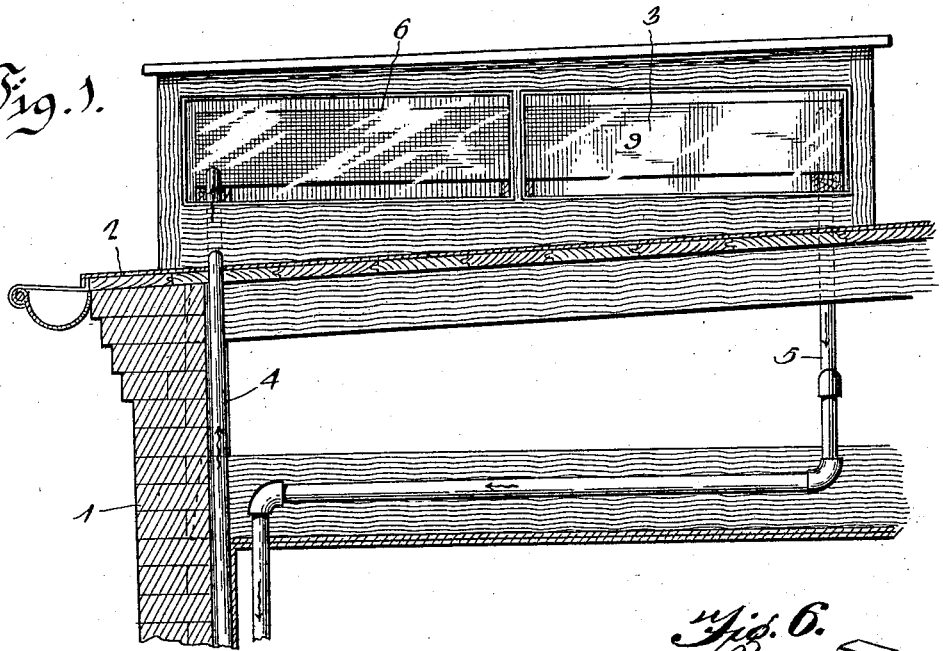
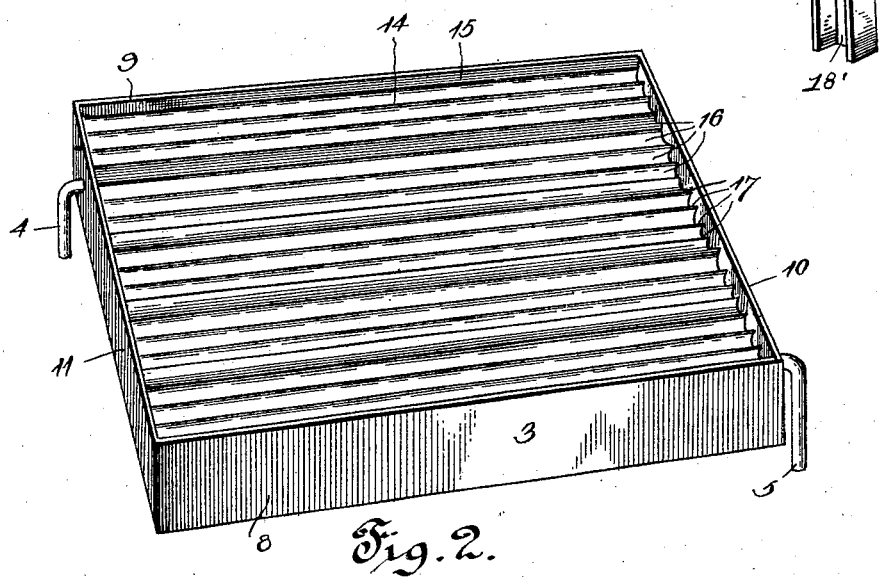
James Macdonald Wishart, Inventor.
Witnesses
By his Attorneys, No. 682,658. Patented Sept. 17, 1901.
J. M. WISHART.
SOLAR HEATER.
(Application filed June 4, 1900.)
(No Model.) 2 Sheets—Sheet 2.

Witnesses
J. Frank Culverwell.
Louis G. Julihn

James Macdonald Wishart,
By his Attorneys,
C. A. Snow & Co.
Inventor.

THE NORRIS PETERS CO., PHOTO-LITHO., WASHINGTON, D. C.

UNITED STATES PATENT OFFICE.

JAMES MACDONALD WISHART, OF OAKLAND, CALIFORNIA.

SOLAR HEATER.

SPECIFICATION forming part of Letters Patent No. 682,658, dated September 17, 1901.

Application filed June 4, 1900. Serial No. 19,018. (No model.)

*To all whom it may concern:*

Be it known that I, JAMES MACDONALD WISHART, a citizen of the United States, residing at Oakland, in the county of Alameda and State of California, have invented a new and useful Solar Heater, of which the following is a specification.

This invention relates to solar heaters, and has for its object the production of a heater designed for the utilization of heat generated by the sun's rays to heat water or other liquids.

Specifically, the object of the invention is to provide a heater of this class designed to constitute a part of a circulatory system, the liquid being caused to circulate through a number of chambers, the circulation being maintained by the effect of the solar heat.

Subordinate to these objects are others, which will more fully appear as the necessity for their accomplishment is developed in the succeeding description.

Figure 3:
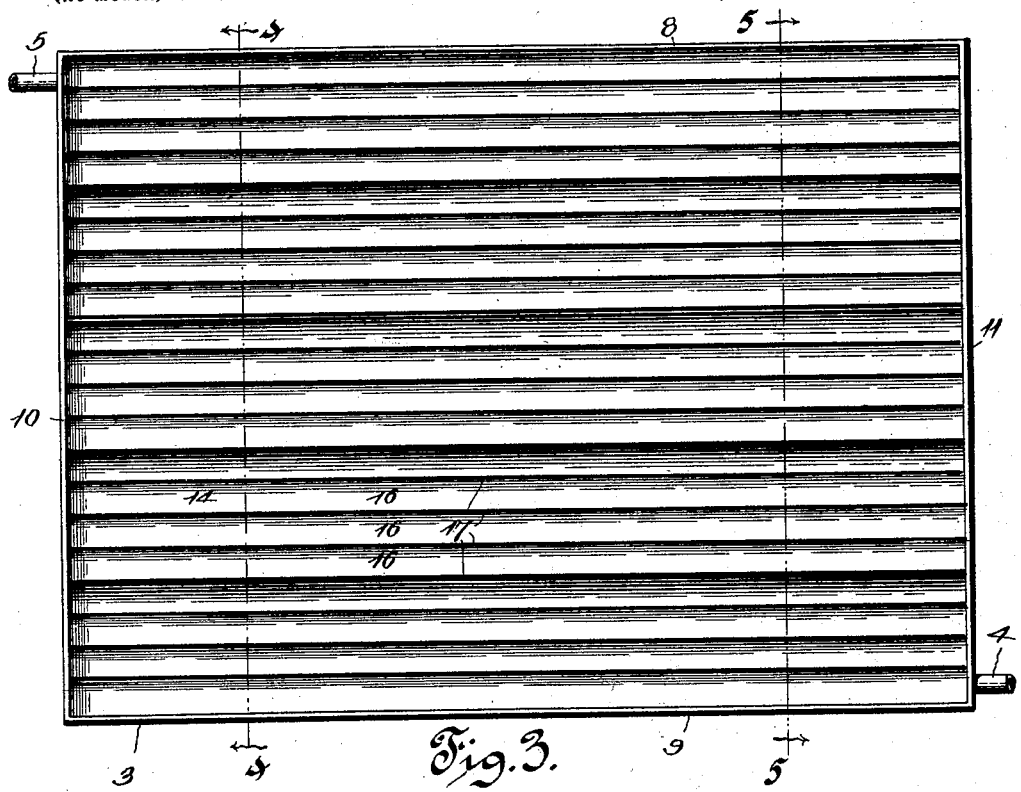
Figure 4:
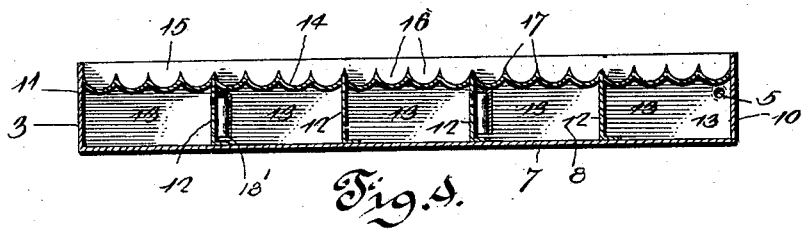
Figure 5:
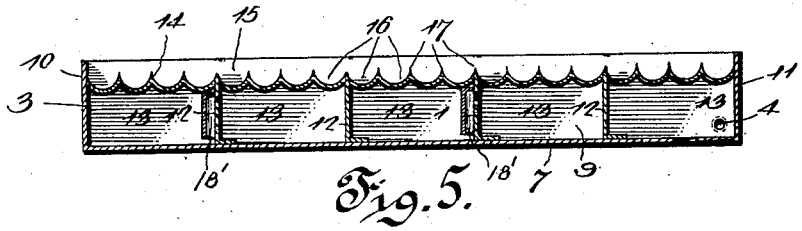

Referring now to the drawings, Figure 1 is a sectional view through a fragment of a house and showing the heater supported upon the roof thereof. Fig. 2 is a perspective view of the heater proper. Fig. 3 is a plan view of the heater. Figs. 4 and 5 are vertical sections taken on lines 4 4 and 5 5, respectively, of Fig. 3 and looking in the directions indicated by the arrows. Fig. 6 is a detail perspective view showing one of the bent plates forming the pipes for communicating the bottom of one compartment with the opening leading to the top of the adjacent compartment.

Referring now to the numerals of reference, each of which is employed to designate a corresponding part in the several views of the accompanying drawings, 1 indicates a fragment of a house, upon the roof 2 of which is located my heater 3, communicating with the direct and return pipes 4 and 5 of a circulatory system and protected by a glass housing 6. Elements capable of these broad designations have been heretofore employed in analogous connections; but I shall now proceed to a description of the specific construction and arrangement constituting the embodiment of my invention.

My heater 3 comprises a substantially rectangular receptacle composed of a bottom 7, front and rear walls 8 and 9, and end walls 10 and 11, respectively. The receptacle thus formed is provided with a series of equidistant longitudinal partitions 12, terminating somewhat below the upper edge of the receptacle and dividing the latter into a number of longitudinal circulating-chambers 13. The top wall or absorption-plate 14 of the heater, formed in a single piece or in a number of sections, as desired, is supported upon the upper edges of the partitions 12 in a manner to leave a space 15 between its surface and the upper edge of the receptacle, and is longitudinally fluted, as indicated at 16, to form an extended series of longitudinal concavities, the contiguous edges of which converge to form ribs 17. By means of this configuration of the absorption-plate I am enabled to get a maximum exposed surface or effective heating area, and as the ribs 17 constitute braces or stiffening devices exceedingly thin sheets of metal are available for employment in this connection.

The direct pipe of the circulating system pierces the end wall 11 at the lower front edge of the chamber 13 at one side of the receptacle. At the rear end of the partition which separates this first chamber from the second and adjacent the upper edge of the partition there is formed a perforation which communicates with a pipe 18, which leads downwardly and opens into the bottom of the second chamber, the pipe 18 being wholly within this second chamber, as shown. This pipe 18 is in the form of a bent plate, as shown, the edges of which are soldered to the partition excepting at the bottom of the plate, so that there is formed what is in effect an open-bottomed pipe. The opposite wall of the second chamber, which is formed by the second partition 12, has a perforation adjacent its upper edge, and at the opposite end of the receptacle from the first perforation described and leading from this second perforation is a second pipe 18', which lies entirely within the third compartment or chamber and opens into the bottom portion of the compartment or chamber. A third perforation is formed in the third partition at the same end of the receptacle with the first perforation and has a pipe lying in and communicating at its lower end with the fourth compartment or chamber. This arrangement is continued throughout the receptacle, so that the bottom of one compartment is connected with the top of the compartment at one side while its top is connected with the bottom of the compartment at the other side, the connections of each chamber or compartment being at opposite ends thereof.

From the foregoing it will appear that the rays of the sun being directed upon the absorption-plate the water within the heater will be heated from the surface, which will induce circulation from end to end and from bottom to top of succeeding heating chambers or compartments and in alternately opposite directions, and the water within the circulatory system connected with the heater will in this manner be kept in continuous motion and will be raised to the desired temperature.

What is claimed is—

1. A solar heater comprising a receptacle, a fluted absorbing-plate covering the receptacle, the contiguous walls of said flutings merging to form upwardly-directed sharpened ribs and corresponding reëntrant angles on its under face, a plurality of vertical partitions in the receptacle and having their upper edges disposed in reëntrant angles of the absorbing-plate, said partitions dividing the receptacle into chambers, ingress and egress pipes communicating with the terminal chambers at their opposite ends and located respectively adjacent the top and bottom of the receptacle, and transfer-pipes located within the chambers and connecting the top and bottom of adjacent chambers alternately at opposite ends of the heater.

2. A solar heater comprising a receptacle, a fluted absorbing-plate covering the receptacle, the contiguous walls of said flutings merging to form upwardly-directed sharpened ribs and corresponding reëntrant angles in its under face, and a plurality of partitions disposed to divide the receptacle into compartments and with their upper edges engaged in the reëntrant angles of the absorbing-plate, the compartments having communication through the partitions and the outer compartments having inlet and outlet openings, respectively.

In testimony that I claim the foregoing as my own I have hereto affixed my signature in the presence of two witnesses.

JAMES MACDONALD WISHART.

Witnesses:
P. W. ANDERSON,
C. J. PARMENTER.